May 12, 1959 R. B. WAY ET AL 2,885,702
MACHINE FOR WIPING AND POLISHING ARTICLES OF MANUFACTURE
Filed March 28, 1955 4 Sheets-Sheet 1

INVENTORS
Robert B. Way
BY Carl D. Hersey
Charles L. Lovercheck
attorney

May 12, 1959 R. B. WAY ET AL 2,885,702
MACHINE FOR WIPING AND POLISHING ARTICLES OF MANUFACTURE
Filed March 28, 1955 4 Sheets-Sheet 3
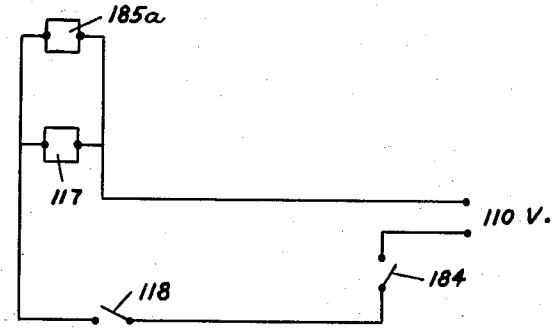
FIG. 3
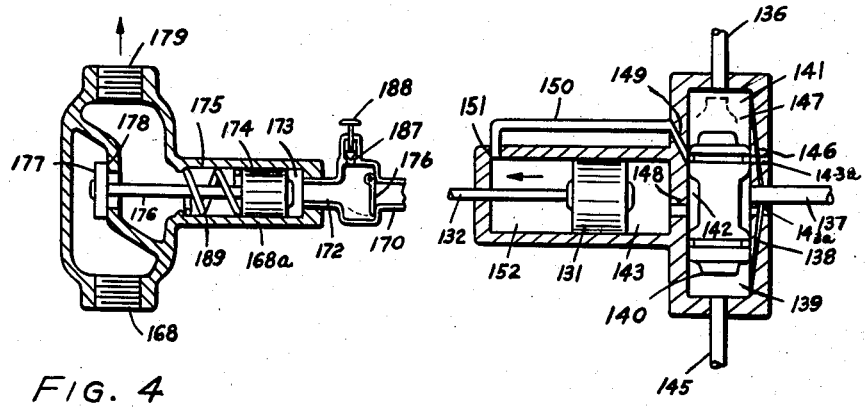
FIG. 4
FIG. 5
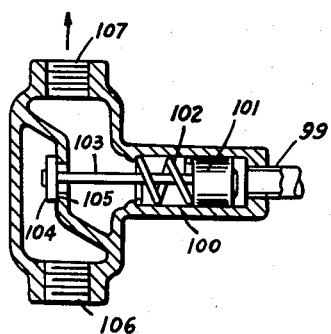
FIG. 6
INVENTORS
Robert B. Way
Carl D. Hersey
BY
Charles L. Lovercheck
attorney United States Patent Office 2,885,702
Patented May 12, 1959

2,885,702

MACHINE FOR WIPING AND POLISHING ARTICLES OF MANUFACTURE

Robert B. Way and Carl D. Hersey, Erie, Pa.

Application March 28, 1955, Serial No. 497,274

18 Claims. (Cl. 15—97)

This invention relates to painting and polishing machinery and more particularly to machinery for wiping the excess paint from articles of manufacture which are to have engraved letters and numerals painted and to have the space around the letters and numerals free of paint. The machine is also useful for removing paint from the surface around engraved letters. It may also be used for polishing articles of manufacture or for other similar manufacturing operations.

This application is a continuation in part of patent application Serial No. 392,152, filed November 16, 1953, now Patent No. 2,820,231, issued Jan. 21, 1958.

Machines for painting which were previously used for the aforesaid purposes applied paint to the entire surface of the part having engraved letters and the excess paint from around the engraved letters was then wiped off manually. This entailed an expensive and time consuming procedure as well as being unpleasant for the operator.

In carrying out this invention, a rotary power driven unit is provided which carries the article to be wiped. A cloth is indexed to provide a fresh area of cloth for each article wiped. A top wiping mandrel supplies a relatively constant pressure against the article as it is being wiped. A means is also provided to spray paint solvent on the cloth to facilitate wiping the excess paint from the article. The article to be wiped is put in the rotary power unit and is moved into engagement with the wiping cloth and the top mandrel engages the wiping cloth on the opposite side thereof from the article. The rotary power unit advances the article, oscillating it in one embodiment of the invention and reciprocatingly sliding it over the cloth in another embodiment, thereby wiping the excess paint therefrom while the top mandrel applies a constant pressure to the cloth to hold the cloth in contact with the article. When the wiping of one article is completed, the rotary power unit retracts the article and indexes the cloth to provide a fresh piece of cloth to wipe the next article.

In carrying out the above, it is an object of this invention to improve upon the previous methods of wiping and polishing the excess paint from articles of manufacture and, more particularly, it is an object of this invention to provide an automatic paint wiping machine which is simple in construction, economical to manufacture, and simple and efficient to use.

Another object of the invention is to provide a paint wiping machine wherein the excess paint can be wiped from parts by placing the parts in the machine and actuating the machine to wipe the parts.

A further object of the invention is to provide a machine for wiping the excess paint from articles of manufacture wherein the paint is wiped from the article by a cloth or screen which is indexed forward to provide a different area to contact each subsequent article, the movement of the machine being a reciprocating motion.

Still another object of the invention is to provide a machine for wiping the excess paint from articles of manufacture wherein a predetermined amount of paint solvent is sprayed onto the wiping cloth prior to its engaging the article to be wiped and the motion of the part relative to the cloth is a reciprocating motion.

A further object of this invention is to provide a wiping and polishing machine wherein the part being wiped or polished is oscillated in an arcuate path in one direction and then in the other direction.

Another object of the invention is to provide an automatic machine for wiping the excess paint from articles of manufacture wherein a substantially constant pressure is applied to the painted surface being wiped while the part is reciprocated or oscillated.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

Fig. 3 is a wiring diagram showing the electrical connections used in the automatic paint wiping machine;

Fig. 4 is a longitudinal cross sectional view of an air actuated valve having a timing device associated therewith;

Fig. 5 is a longitudinal cross sectional view of another air actuated valve having an air cylinder associated with and operated by the valve;

Fig. 6 is a longitudinal cross sectional view of another air actuated valve according to the invention;

Fig. 8 is a partial view of another embodiment of the invention;

Fig. 9 is a bottom view of the embodiment of the invention shown in Fig. 8;

Figure 1:
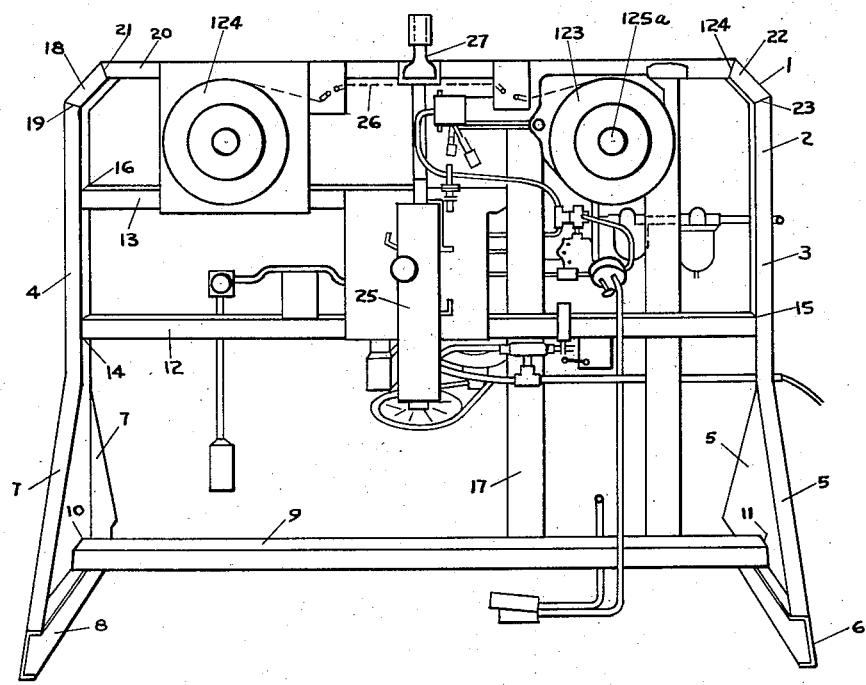
Fig. 1 is a front view of an automatic machine for wiping the excess paint from articles of manufacture according to the invention drawn to a reduced size scale relative to the other figures of drawing.

Now with more specific reference to the drawings, Fig. 1 shows an automatic paint machine 1 having a frame 2 for supporting the various elements of the machine 1. The frame 2 is made up of vertically extending end members 3 and 4. The end member 3 has flared base members 5 extending outwardly and attached to the floor engaging laterally extending member 6. In like manner, the vertical member 4 has outwardly flared members 7 which are attached at the bottom end to the floor engaging member 8. The end members 3 and 4 are tied together by the brace 9 which is welded to the end member 4 at 10 and to the end member 3 at 11. A longitudinally extending intermediate member 12 is welded to the end member 4 at 14 and to the end member 3 at 15 and an intermediate member 13 is welded to the end member 4 at 16 and to the intermediate vertically extending member 17. The inwardly directed top member 18 is attached to the end member 4 at 19 and to the laterally extending top member 20 at 21. The inwardly extending top member 22 is attached to the end member 3 at 23 and to the member 20 at 24.

The frame 2 is provided for supporting the various elements of the machine 1 and the frame 2 could be made in the above described way or it could be varied to conform to the requirements of any particular job.

The essential major components of the machine 1 are the rotary power unit 25, the cloth towel or wiping cloth 26, the top wiping mandrel 27, and the associated electrical and air driven equipment. The word "cloth" as used herein is meant to include any sheet of material suitable for wiping or polishing, including cloth and fabric material having abrasive and other polishing materials thereon, and mesh screens.

Figure 7:
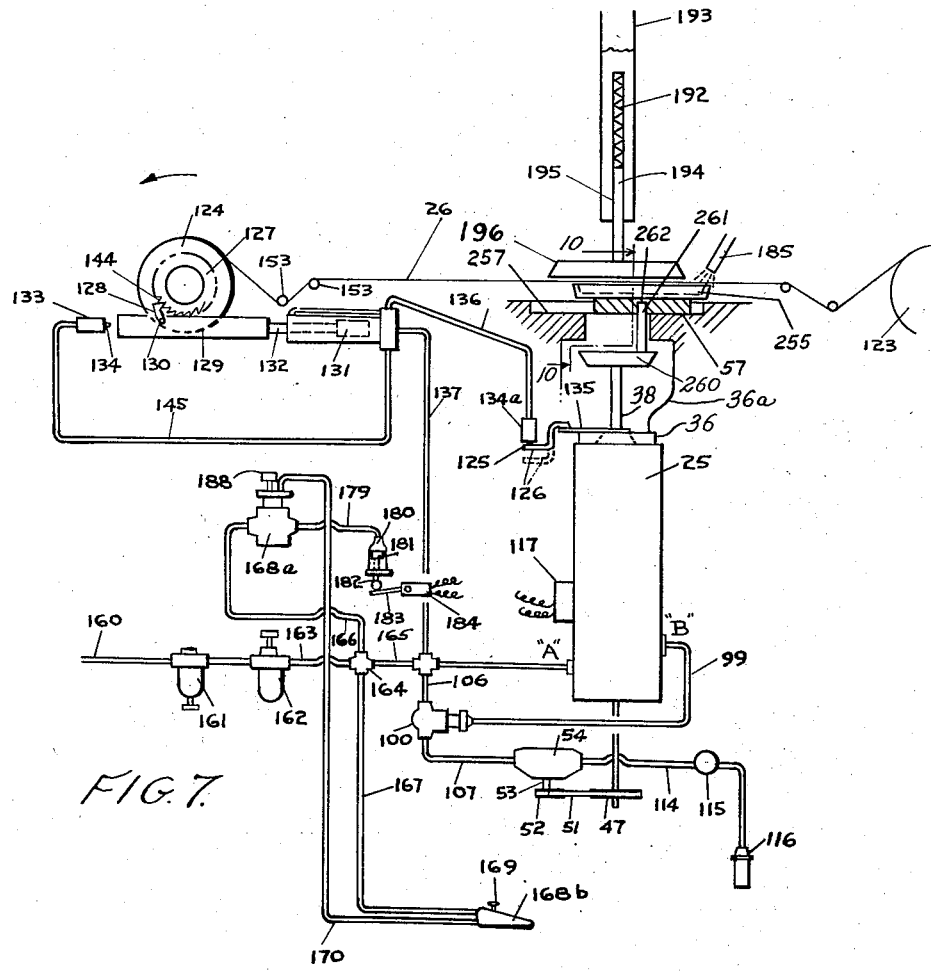
Fig. 7 is a schematic piping diagram of the paint wiping machine shown with some parts in longitudinal cross section.
Figure 10:
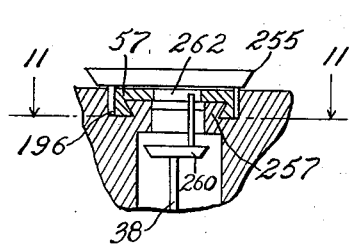
Fig. 10 is a view taken on line 10—10 of Fig. 7.
Figure 11:
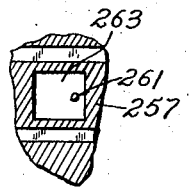
Fig. 11 is a view taken on line 11—11 of Fig. 10.

A schematic piping layout of the machine 1, including the rotary power unit 25, is shown in Fig. 7. A diagram of the rotary power unit 25 is shown in detail in Fig. 2. The rotary power unit 25 has a frame 31 which is attached to and supported on the frame 2 of the machine 1. The frame 31 is also attached to a four way air valve 32 which carries a cylinder 34. A piston 33 reciprocates in cylinder 34 and has a piston rod 35 attached thereto at 36c and the piston rod 35 is guided in the frame 31 at 36b. At the upper end of the piston rod 35, a transverse frame member 36 is attached at 37 by means of a nut 38a which threadably engages the piston rod 35 so that the lower shaft 38, the tie rods 39, and the lower frame 40 move as a unit. The tie rods 39 are attached to the frame member 36 and hold the members 40 thereto by means of inner lock nuts 41 and outer lock nuts 42.

The upper frame member 36 of the power unit 25 has a thrust bearing 43 which carries the shaft 38 with it when the piston 33 applies a force through piston rod 35 and moves the frame 36 upward at the same time, allowing the shaft 38 to rotate in the bearing 43. The shaft 38 has a telescopic splined joint 45 which receives the lower splined shaft 46. The lower shaft 46 has a pulley 47 attached thereto and is held against axial movement in a housing 50 by a thrust bearing 48. Thrust bearing 48 is fixedly supported at 49 in the housing 50 which is integral with the frame 31. The shaft 46 driving shaft 38 is rotated through the pulley 47 by a belt 51 which operatively engages a pulley 52 on a shaft 53 of air motor 54.

A part holder 255 preferably has a concave surface on the top thereof and the concave surface will conform to the contour and be the counterpart of one side of an article from which excess paint is to be wiped. The part holder 255 is attached to a slidable support 57 and the slidable support 57 is slidable in ways 257. The ways 257 are carried by the frame 36. The support 57 also has a transverse slot 262 therein. The transverse slot 262 receives the upper end of a pin 261 and the pin 261 moves laterally in the slot 262 as the support 57 reciprocates on the ways 257 and as the member 260 swings the pin 261 in a circular path. The ways 257 are received in complementary shaped slots in the part holder support 57. The shaft 38 has the disk 260 thereon and fixed thereto which rotates therewith. The disk 260 has the pin 261 fixed thereto and offset from the center of rotation of the shaft 38 and the disk 260. The pin 261 acts as a crank as it swings in a circular path around the center of the shaft 38. A square opening 263 is cut in the ways 257 through which the pin 261 extends and swings in its circular path. The longitudinal component of the motion of the pin 261 around the center of the shaft 38 carries the support 57 in a reciprocatory path along the ways 257.

A trigger shaft 59 is fixedly and adjustably held in the upper frame member 36 by lock nuts 60 and 61 which are threadably attached to the shaft 59. The nuts 60 and 61 can be adjusted on the shaft 59 to move cam 62 up or down to adjust the longitudinal stroke of the piston 33. The cam surface 62 is integrally attached to the shaft 59 at the lower end thereof to actuate the release member 63.

A checking device 64 is a part of the rotary power unit 25 and its frame is attached thereto and is made up of the piston 65 which slides in a cylinder 66 and is supported on a frame member 67 which is integral with the frame 31. An oil reservoir 68 is attached at 69 to the frame 67 and a needle valve 70 may be adjusted to regulate the flow of oil from the cylinder 66 through a passage 71 and through a pipe 72 into the oil reservoir 68.

On the upward stroke of the piston 65, the shaft 38 moves upward carrying the power unit frame with it and bringing the frame member 40 into engagement with nut 108 which is attached to a shaft 77. As the shaft 38 moves upward, the threaded portion of the shaft 77 slides through a hole 79. This moves the piston 65 upward to expel oil from the cylinder 66 through the passage 71 and through the pipe 72 to the reservoir 68. On the downward stroke of the shaft 38 when it is pulled down by the piston 33, the frame member 40 will engage a nut 80 and pull the piston 65 downward, thereby drawing oil through the pipe 72, through the passage 75, past the ball check valve 74, and back into the cylinder 66. It will be apparent that oil cannot flow from the cylinder 66 past the check valve 74 on the upward stroke of the piston 65. Nuts 80 and 81 can be locked in any position to pull the piston 65 downward to the desired position, thereby adjusting the point at which the effect of the checking device takes affect. When the frame member 40 is pulled upward by the shaft 38, the frame 40 and the shaft 38 will move rapidly until the frame member 40 engages the nut 80. At this point, the speed of advance of the frame 40 urged by the air pressure below the piston 33 will be retarded by the resistance of the piston 65 expelling oil from the cylinder 66. This resistance can be adjusted by means of the needle valve 70 which determines the rate of flow of oil and, therefore, the time taken for the piston 33 to move the shaft 38 upward the balance of its stroke after it has engaged the nut 108. The nut 108 will be set so that it is engaged about the time the article in the article receiving member 255 engages the cloth 26 and will, therefore, determine the time the article supported in part holder 255 is in contact with the cloth 26.

A valve piston 83 is attached to a solenoid 117 at 89 and when the solenoid 117 is actuated, the valve piston 83 is pulled down so that the point 89 moves to the dotted line position 90. A notch 91 is engaged by the trigger or release member 63 which is urged into engagement with the notch 91 by means of a spring 92. When the valve piston 83 is pulled down to the actuated position so that the point 89 is at the dotted line position 90, air will flow into the space 97 below the piston 33 and will flow through an air inlet 88 to a passage 94 past a reduced size portion 93 of the valve piston 83, through the passage 96, and into the space 97 below the piston 33, thereby applying a force to the piston 33 and allowing the air in the space above piston 33 in cylinder 34 to exhaust through passage 84 past reduced size portion 86 which will then align with an exhaust port 113. The pressure below the piston 33 in the space 97 will, therefore, urge the piston 33 with the frames 36 and 40 attached thereto upward rapidly until the frame 40 engages the nut 108 whereupon the speed of upward movement of the frame 40 will be retarded as explained above. Simultaneously, air from the space 97 will pass through passage 98, through the pipe 99 to two way pilot valve 100 and will actuate a piston 101 therein to move it downward against the force of a spring 102, opening valve 104 through a shaft 103 and allowing air to flow from pipe 106 through the opening past the valve seat 105 to the pipe 107 and through the air motor 54, actuating it through the pipe 114 and through regulating valve 115 which is adjusted to control the speed of the motor 54. Air from valve 115 exhausts to the atmosphere through a muffler 116.

The passage 84 communicates with the area above the piston 33 in the cylinder 34 and through passage 85 past the reduced size portion 86 of the valve piston 83 and actuates air from inlet 88 through passage 81a. When the trigger 63 is released to allow spring 110a to move the piston 83 upward to close off the flow of air from the passage 94 to the passage 96, the air pressure in the space 97 below the piston 83 will decrease and, therefore, decrease the air pressure in the pipe 99 which will cause the air motor 54 to stop, thereby stopping rotation of the shaft 38 during the downward movement of the shaft 38.

The electrical power to actuate the solenoid 117 is supplied through a limit switch 118 which is carried by a frame member 119. The limit switch 118 breaks the current to solenoid 117 as soon as the frame 40 moves out of engagement with the limit switch 118 on the upward movement of the piston 33.

The wiping cloth 26 is supplied on reels or spools 123 and 124. The spool 123 is rotatably mounted on axle 125a and the spool 124 is supported on the frame 2 and has a ratchet member 127 fixed thereto. The ratchet 127 is engaged by a pawl 128 which is pivoted to a sliding member 129 at 130. The sliding member 129 is in turn attached to a piston 131 through a piston rod 132, the movement of the piston 131 being limited by a poppet valve 133 which has an outwardly extending member 134 which is engaged by the slide member 129 when the slide member 129 is in its extreme left position and the part holder 255 is in its extreme top position. The position of poppet valve 133 can be adjusted to control the length of cloth moved on each stroke of slide 129. The poppet valve 134a has an actuating member 125 which engages a member 126 which is carried by the movable frame 31. The member 126 is shown in its up position in Fig. 7 in full lines and in its down position corresponding to the down position of the frame 36 in dotted lines in Fig. 7. Member 36a indicates a mechanical connection between the ways 257 and the movable frame 36. As the piston 33 moves upward carrying the shaft 38 and movable frame 31 with it and reaches the top of its stroke, the member 126 engages the actuating member 125, allowing air to exhaust from the space 141 at one side of the piston valve 131 and reducing the pressure therein. Thus, air pressure in space 141 is reduced and air from supply pipe 137 which has flowed through reduced size opening 138 to the space 139 at one side of the valve piston 140 to build up a pressure therein forces the piston 140 toward the pipe 136. The pressures on opposite ends of piston 140 will be unbalanced. The air in the space 139 will expand and force the valve piston 140 to the dotted line position 147. Air will then be allowed to flow around reduced size portion 142 through opening 148 into a space 143 at one side of the piston 140. The force exerted on piston 131 by air in the space 143 will drive the piston rod 132 to the left, moving the ratchet pawl 128 around to engage another notch 144 of the ratchet wheel 127. When the slide member 129 reaches the end of its stroke, it will engage the member 134 of the poppet valve 133 and open the poppet valve 133, allowing air to flow from pipe 145, reducing the pressure in the space 139. By this time, mandrel 55 has moved downward to move member 126 away from poppet valve 134a and poppet valve 134a has closed and air has flowed through the small opening 146 to build up pressure in the space 141. When the pressure in the space 139 is, therefore, released by member 126 opening poppet valve 134a at the top of the mandrel stroke, the pressure in the space 141 will cause the valve piston 140 to move to the dotted line position 147 and close the flow through the opening 148 into the space 143, thereby allowing main line air to flow around the reduced size portion 142 of the piston 140, through the opening 149, through pipe 150, to opening 151, and into space 152 at the other side of the piston 131, thereby applying a force to the side of the piston 131 in space 152 and driving it to the right, causing the pawl 128 to pull the ratchet 127 along with it and, thereby rotate the spool 124, winding the cloth 26 thereon and pulling it between pins 153. The pins 153 are provided to hold the cloth 26 in one plane regardless of the amount of cloth on each spool 123 and 124. The air from the space 143 can exhaust through the opening 148 and to the ambient atmosphere through opening 143a.

During operation, the painted part to be wiped is placed in depression 58 of the part holder 255. The nut 108 is adjusted to a position on shaft 77 where frame member 40 will engage at substantially the same time that the piece supported in holder 255 engages the cloth 26. The knob 188 is set to control the time required for the air in space 172 to exhaust to allow piston 174 to return to the position shown in Fig. 4, closing the valve 177. During the time the valve 177 is held open, the microswitch 184 will be closed and the piston 33 will continue to move up and down during this time interval. The circuit through switch 184 remains closed, the circuit through limit switch 118 being intermittently broken to release solenoid pull on piston 83. Knob 82 is set to give the desired reciprocating speed during the portion of the stroke of the frame 40 carrying part holder 255 so that the part in holder 255 is in contact with the cloth 26. With the part to be wiped in place, button 169 is depressed which sends main line air from line 160 to the timer end of timer operated three way valve 168a which is opened thereby and sends main line air to small spring return air cylinder 181 which in turn, through its piston rod 182, presses the microswitch 184, thus closing the circuit through the limit switch 118 and the limit switch 118 is held in closed position by the frame member 40. The circuit is, thereby, closed through the solenoid 117 and the solenoid on the spray gun 185. The power through the electric circuit actuates the spray gun 185 to spray a small amount of solvent on the cloth 26. The power also actuates the solenoid 117 in the rotary power unit 25 which in turn opens the valve piston 83 in the rotary power unit 25, allowing the shaft 38 which is attached to the holder 255 to advance upward driven by main line air pressure by the piston 33 of the rotary power unit 25. At the same time, air is allowed to build up a pressure behind the piston 33 to flow through the tubing 99 to actuate the piston 101 of the two way pilot valve 100, causing it to open and send main line air pressure to rotate the air motor 54 which is belted by a V-belt to the pulley mounted on the motor 54 of the rotary power unit 25. The air motor 54 is caused to rotate at the speed determined by the adjustable valve 115.

As the shaft 38 and holder 255 holding the article to be wiped advance upward while reciprocating, they are hydraulically checked by engagement with nut 108 and the speed of upward movement is controlled by the knob 82 on top of the rotary power unit 25. The rate of movement is controlled by the adjustment of the knob 82 on top of the checking device 64 which controls the movement of piston 65 and, therefore, the upward movement of the piston 33 which is then moved slowly upward after the article contacts the cloth 26 and the frame member 40 contacts nut 108. This brings the cloth 26 into engagement with the backing member 196 supported on the top wiping mandrel 27. A U-shaped sleeve 193 contains a spring 192 and, due to the pressure of the upper spring loaded wiping mandrel 27, the part is wiped clean of excess paint. The pressure on the part being wiped could be changed by varying the strength of the spring 192.

As the piston 33 moves upward to carry an article into contact with the cloth 26, the piston 131 of the four way valve is automatically actuated by main line air pressure and the piston 33 of the rotary power unit 25 is forced upward by the main line air pressure as explained above and, at the same time, exhausts air below the piston 33 and also exhausts air from the pilot end of the pilot control two way valve 100, thus causing the valve 100 to close and shut off the main line air to the rotary motor 54. This will cause the motor 54 to stop and the shaft 38 and frame 40 to return to their original positions and again close the circuit from main switch 118. When the rotary power unit 25 and frame 40 carrying holder 255 reach the upper end of the stroke, the bar 126 engages the poppet valve 134a which bleeds the four way valve attached to the rotary indexing unit which winds up the cloth 26, thus reversing the four way valve and causing main line air to force piston 131 to actuate slide member 129 to operate ratchet 127, thereby indexing the cloth 26. This causes the ratchet 127 to rotate the spool 124 a part of a revolution, pulling a new cloth tape in position for the next stroke of the mandrel 55. The bar 126 is carried on the frame 36 and moves up and down therewith.

During the time the article is in contact with the cloth 26, constant pressure is applied on the part being wiped by the spring 129 which is supported in the U-shaped member 193. It will be noted that the movable upper mandrel 194 is telescopically received at 195 in the upper support. As the shaft 38 moves upward and the part is moved into engagement with the cloth 26, the cloth 26 is forced into engagement with the upper backing member 196 and as the shaft 38 continues to move upward, the spring 192 is compressed, the spring 192 being of such design that it maintains a substantially constant force on the top of the cloth 26 as the shaft 38 moves upward. When the shaft 38 moves to the uppermost part of its stroke and the cam 109 has released the sliding trigger member 63, the piston 33 will retract and pull the part out of engagement with the cloth 26.

The purpose of the guiding pins 153 is to guide the cloth tape 26 through the machine 1 at the same level at all times regardless of the amount of cloth tape which is contained in either spool 123 or 124. This gives an even contact of the cloth tape against the article to be wiped at all times. The spool 123 is an idler spool fully filled with cloth tape at the start of the operation and the cloth is gradually unwound by the indexing action of the right handle spool 124 by means of the ratchet 127 as described. The spool 123 is retarded from overrunning by a spring loaded brake disk (not shown) of conventional design which is at the rear of the spool 123.

The above description completes one cycle of the machine and if one cycle is not sufficient to clean the article, it is not necessary for the operator to press the button 169 for a second stroke. The air index knob 188 can be closed slightly to keep the piston 174 in actuated position, thereby keeping the microswitch 184 closed during the time required for the rotary power unit 25 to go through two cycles for one depression of button 169.

Because of the speed at which the rotary power shaft 38 and holder 255 return to normal position and the natural lag of the piston 174 and, also, the lag of the index unit which drives spool 124, the cloth tape does not start to move until the holder with the wiped part has moved away from the cloth tape and has finished moving the cloth before the next cycle reaches the tape height.

Figure 2:
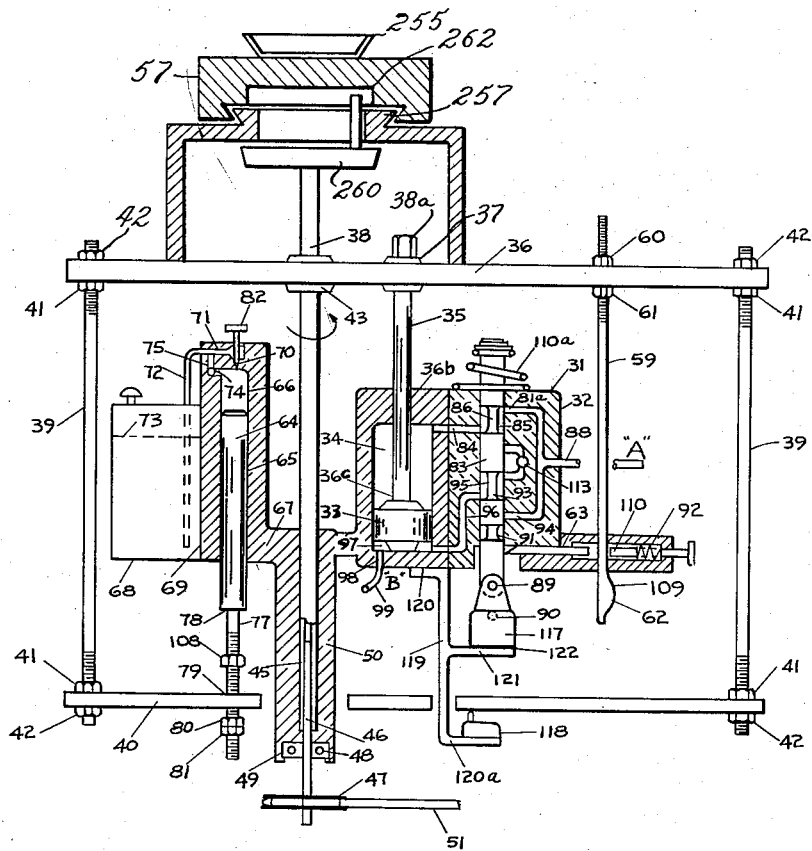
Fig. 2 is a view partly in cross section of a rotary power unit for carrying the part to be wiped into contact with a wiping cloth.

In the embodiment of the invention shown in Figs. 8 and 9, the frame of the machine and the rotary power unit shown in Fig. 2 will be exactly the same as that described above; however, instead of the belt 51 driving the pulley 47, an arm 151a will be fixed to the pulley as shown in Fig. 8 at 162a. The motor 154a will be mounted on the frame 150a and the pulley 152a will have a pin 172a engaging the slot 173a in the arm 151a. Rotation of the pulley 152a driven by the motor 154a will cause the pin 172a to slide backward and forward in the slot 173a as it rotates, oscillating the arm 151a and, therefore, the shaft 146a attached thereto. The part to be wiped will be supported in a part holder fixed to the upper end of the shaft 38 and the article being wiped will oscillate in a counter-clockwise direction followed by partial rotation in a clockwise direction in engagement with the cloth.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A machine for polishing articles of manufacture comprising a frame, an article holder supported on said frame, a wiping cloth supported on said frame, said article holder being supported on means to move said article toward said cloth to bring an article supported in said article holder into engagement with said wiping cloth, means on said machine to reciprocate said holder in a plane parallel to said cloth, means on said machine to hold said cloth in engagement with said article while said article is being polished, the portion of said wiping cloth adjacent said article holder being supported in generally flat relation, and means to intermittently deposit a solvent liquid on said cloth to facilitate polishing said article.

2. A wiping machine for wiping and polishing articles of manufacture comprising a frame, an article carrying means on said frame, a motor rotatably connected to said article carrying means, said article carrying means having an air actuated piston connected thereto moving said carrying means and an article supported in said carrying means into engagement with a cloth, the portion of said cloth adjacent said article carrying means being supported in generally flat relation, said cloth being supported on said frame, means to index said cloth to bring a different section thereof into engagement with the article supported in said carrier each time said article is brought into engagement with said cloth, and means to reciprocate said article and said carrying means in engagement with said cloth in a plane parallel to said cloth.

3. The wiping machine recited in claim 2 wherein a backing member is provided to hold said cloth in engagement with the article being wiped during the wiping operation.

4. The wiping machine recited in claim 3 wherein means on said frame is provided for spraying a liquid solvent on said cloth adjacent the part thereof in engagement with said article whereby foreign matter thereon is softened.

5. A wiping machine comprising a frame, a rotary power unit supported on said frame, said power unit having a shaft rotated intermittently by a motor, an article supporting member on said shaft, means attached to said shaft adapted to move said shaft axially to bring said article adapted to be supported in said supporting member into engagement with a sheet of wiping material, means to move said shaft and said article supported thereon out of engagement with said wiping material after a predetermined time, means to index said wiping material bringing another section of wiping material into position to engage the article supported in said article support each time said means moves the article out of engagement with said wiping material, said indexing means being synchronized with said shaft, the portion of said wiping member adjacent said article holder being supported in generally flat relation, the axis of rotation of said holder being generally perpendicular to the flat surface of said wiping material, and means to reciprocate said article and said holder in engagement with said wiping material and in a plane parallel to said wiping material, said means reciprocating said article in one direction and then in the other.

6. The wiping machine recited in claim 5 wherein means is provided on said machine to move said shaft rapidly a predetermined distance toward said wiping material and to move said shaft at a slower rate as it engages said wiping member in engagement with said wiping material whereby said article is polished.

7. The wiping machine recited in claim 6 wherein a backing member engages said wiping material to hold it in engagement with said article while said article is being wiped, said backing member applying a substantially constant force on said wiping material.

8. The wiping machine recited in claim 7 wherein said backing member comprises a hollow member attached to said frame, a member telescopically engaging said hollow member and engaging said wiping material, and a spring in said hollow member holding said backing member in engagement with said wiping material at substantially constant pressure as said article supporting member moves upward and reciprocates said article in engagement with said wiping material.

9. The wiping machine recited in claim 8 wherein a means is provided on said machine to spray liquid on said wiping material as said wiping material moves through said machine to dissolve foreign material on said article.

10. A wiping machine comprising a frame, a rotary power unit supported on said frame, said rotary power unit comprising a shaft, an article supporting member carried by said shaft, said shaft being attached to an air actuated piston adapted to bring said article into engagement with a cloth, said piston movable in a cylinder mounted on said frame whereby said shaft is moved axially, an air motor to rotate said shaft, means to control the air supply to said piston and said air motor, a cloth, means to index said cloth to bring a different part thereof into engagement with an article supported in said support each time a said article is brought into engagement with said cloth, means to hold said cloth in engagement with the article in said support, the movement of said article into engagement with said cloth, rotation thereof in engagement therewith, and retraction therefor being a cycle, the air to said piston being controlled by a timer valve, said timer valve adapted to remain open a greater duration of time than one said cycle whereby the air is repeatedly applied to said piston to move said shaft and said article thereon axially into engagement with said cloth a plurality of times for each time said air control means is actuated, and means to reciprocate the article being cleaned in engagement with said cloth.

11. The wiping machine recited in claim 10 wherein means is provided to control the speed at which said article support is rotated.

12. The wiping machine recited in claim 10 wherein said piston moves said article support rapidly until said article in said support means engages said cloth whereupon said article support moves slowly, means being provided to adjustably control the time during which said piston moves upward after said article in said support engages said cloth.

13. A wiping machine comprising a shaft having an article support means thereon, means to rotate said shaft, a cylinder suported on said machine, an air actuated piston operable in said cylinder and attached to said shaft to move said shaft toward a wiping cloth supported on said machine in spaced relation to said piston, valve means to supply air to a first side of said piston to move said shaft toward said cloth, valve means to stop the flow of air to said first side and direct the flow of air to a second side of said piston to force said shaft away from said cloth, and means to reciprocate said article in a plane parallel to said cloth in engagement with said cloth.

14. The wiping machine recited in claim 13 wherein the air from said first side of said piston actuates a pilot valve to admit air to an air actuated motor, said motor constituting said means to rotate said mandrel.

15. The wiping machine recited in claim 13 wherein index means is provided to move said cloth, and cam means on said shaft is adapted to engage means to actuate an air controlled mechanism whereby said index means is actuated.

16. A machine for wiping articles of manufacture comprising a shaft having an article support on one end thereof, a wiping cloth, means to move an article in said support into engagement with said cloth, means to oscillate said article support on said shaft in a plane parallel to said cloth when said article is in engagement with said cloth, said means to oscillate said article stops the oscillation of said article when said article disengages said cloth, and means to actuate said oscillating means and said article support, said means to actuate said oscillating means comprising a foot operated valve admitting air intermittently to a timer valve, said timer valve actuating an electrical circuit operating said shaft moving means during the time said timer valve is open, said timer valve adapted to be adjusted to remain open a predetermined time after said foot valve has operated whereby said electrical circuit is actuated repeatedly to cause said article support means to move an article supported in said support means into engagement with and away from said cloth a plurality of times.

17. The machine recited in claim 16 wherein a means is provided on said timer valve for moving the cloth which is synchronized with said shaft to provide a fresh area thereof to engage the article each time the shaft moves toward said cloth.

18. The machine recited in claim 17 wherein means is provided to control the length of time said article in said article support is in engagement with said cloth.

References Cited in the file of this patent
UNITED STATES PATENTS

| | | |
|---|---|---|
| 237,558 | Lee | Feb. 8, 1881 |
| 471,723 | Steen | Mar. 29, 1892 |
| 1,053,468 | Beadle | Nov. 20, 1942 |